NICHOLAS GROEL.
Improvement in Trunks.
No. 119,348.  Patented Sep. 26, 1871.
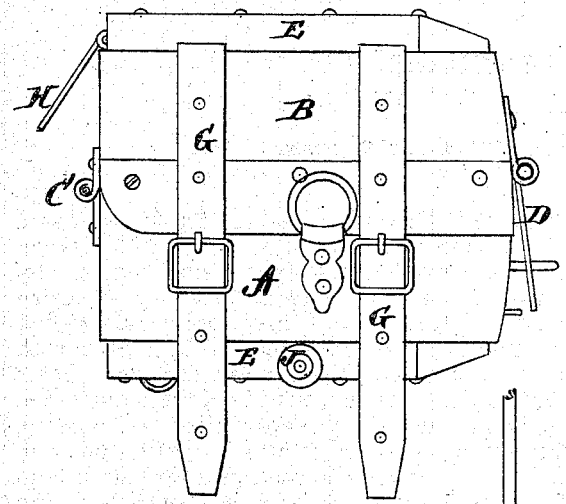
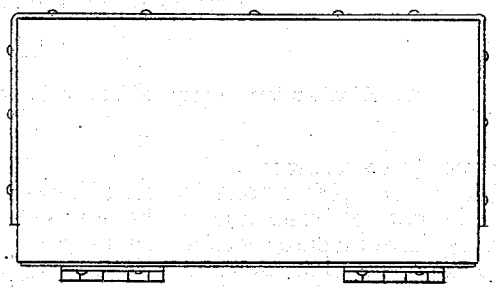
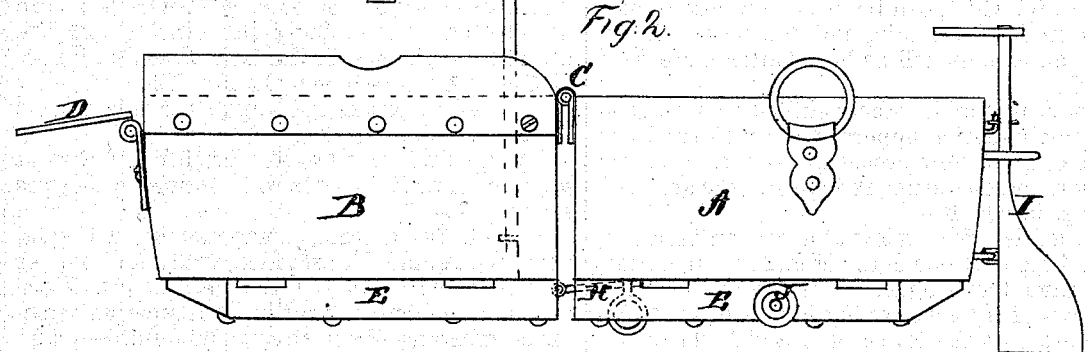
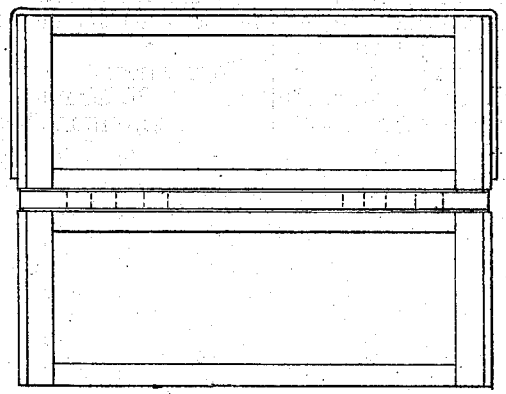
Witnesses
Jas. E. Hutchinson
C. L. Evert
Inventor
Nicholas Groel.
per
Alexander Mason
Atty.

UNITED STATES PATENT OFFICE.

NICHOLAS GROEL, OF NEWARK, NEW JERSEY.

IMPROVEMENT IN TRUNKS.

Specification forming part of Letters Patent No. 119,348, dated September 26, 1871.

*To all whom it may concern:*

Be it known that I, NICHOLAS GROEL, of Newark, in the county of Essex and in the State of New Jersey, have invented certain new and useful Improvements in Combined Trunk, Boat, &c.; and do hereby declare that the following is a full, clear, and exact description thereof, reference being had to the accompanying drawing and to the letters of reference marked thereon making a part of this specification.

The nature of my invention consists in a water-proof trunk, which can be used as a boat or as a shelter on land for rain, and can be drawn by man or animal, as will be hereinafter more fully set forth.

In order to enable others skilled in the art to which my invention appertains to make and use the same, I will now proceed to describe its construction and operation, referring to the annexed drawing, in which—

Figure 1 is a front view of a trunk closed and having hinges at one end. Fig. 2 is a side view of the same trunk open. Figs. 3 and 4 are similar views of a trunk having hinges on one side.

A represents the lower part and B the upper part of a trunk, the said two parts being made exactly of the same size and hinged together at one end by one or more hinges, C, and fastened at the other end by a hasp, D. This trunk is made water-proof in any suitable manner or by any suitable means, and provided with longitudinal ribs E E both on top and bottom, and with straps G G passing around the trunk under said ribs. It can be opened so as to form a boat, when the two parts A and B are fastened together by a hasp, H, or other suitable fastening, as shown in Fig. 2. A rudder, I, may then be attached at one end, and the boat propelled by oars or with masts and sails. The rudder, oars, and masts may be placed on the outside of the trunk when used as a trunk, between the ribs, and held by the straps, so as not to interfere with the room inside. It can also be used as a shelter on land from rain or storm. Side rollers or wheels J J are attached, as shown, and a pole or shaft may be attached to the slot in the hasp D, so that it may be drawn by horses or by hand. The same may be applied to trunks opening at the side instead of at one end.

Having thus fully described my invention, what I claim as new, and desire to secure by Letters Patent, is—

A water-proof trunk, composed of two equal portions, A and B, provided with the hasp or bottom brace H, and having suitable provisions for the attachment of rowing and steering apparatus, substantially as shown and described, and for the purpose set forth.

In testimony that I claim the foregoing I have hereunto set my hand this 12th day of July, 1871.

NICHOLAS GROEL.

Witnesses:
A. N. MARR,
FERDINAND SOMMER.

(114)